United States Patent Office 3,549,758
Patented Dec. 22, 1970

---

3,549,758
5,6,7,8 - TETRAHYDRO - 2H - PYRIDO[2,3-e][1,3] OXAZINE - 2,4(3H)-DIONE AS A SEDATIVE, ANALGESIC AND ANTICONVULSANT

Franz Ostermayer, Riehen, and Ernest F. Renk and Rolf Denss, Basel, Switzerland, assignors to Geigy Chemical Corporation, Ardsley, N.Y., a corporation of New York
No Drawing. Original application Aug. 24, 1967, Ser. No. 662,874, now Patent No. 3,489,753, dated Jan. 13, 1970. Divided and this application Feb. 14, 1969, Ser. No. 813,362
Int. Cl. A61k 27/00
U.S. Cl. 424—248                                4 Claims

ABSTRACT OF THE DISCLOSURE 5,6,7,8-tetrahydro-2H-pyrido[2,3 - e][1,3]oxazine - 2,4-(3H)-dione and its addition salts with inorganic or organic acids or base, which compounds have useful sedative, hypnotic and narcotic as well as narcosis potentiating activity, and also exhibit analgesic and antiphlogistic action as well as a muscle-relaxing and anticonvulsive effect, and processes for the production of these compounds; therapeutic compositions containing 5,6,7,8-tetrahydro - 2H - pyrido[2,3-e][1,3]oxazine-2,4(3H)-dione or a pharmaceutically acceptable addition salt thereof and methods of treatment, particularly methods of inducing sedative as well as analgesic effects, and of treating spastic conditions, in a host.

---

CROSS REFERENCE

This is a division of Ser. No. 662,874, filed Aug. 24, 1967, issued Jan. 13, 1970 as U.S. Pat. No. 3,489,753.

DETAILED DISCLOSURE

This invention relates to an oxazine derivative having valuable pharmacological properties. More particularly the invention pertains to 5,6,7,8-tetrahydro-2H-pyrido[2,3-e][1,3]oxazine-2,4(3H)-dione and to addition salts thereof with acids or bases. The invention is further concerned with processes for the production of this compound and these addition salts. It is also an object of the invention to provide therapeutic compositions consisting essentially of (1) 5,6,7,8-tetrahydro - 2H - pyrido[2,3-e][1,3]oxazine-2,4(3H)-dione, or a pharmaceutically acceptable addition salt thereof with an inorganic or organic acid or base, and (2) a pharmaceutical carrier. Another object of the invention is to provide methods of treatment involving the administration to a host requiring such treatment of an effective amount of the pharmacologically active oxazine derivative according to the invention, or a pharmaceutically acceptable addition salt thereof with an inorganic or organic acid or base; the methods of treatment according to this invention comprise particularly a method of producing a sedative effect, a method of producing an analgesic effect as well as a method of treating spastic conditions. The term "host" when used in this specification and the appended claims contemplates animals broadly, particularly mammals, and especially humans.

5,6,7,8 - tetrahydro - 2H - pyrido[2,3-e][1,3]oxazine-2,4(3H)-dione of Formula I

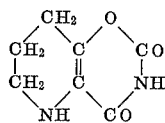

and its addition salts with inorganic or organic acids or bases have not been known up to now.

This oxazine derivative may be prepared by catalytic hydrogenation of the known 2H-pyrido[2,3-e][1,3]oxazine-2,4(3H)-dione of Formula II

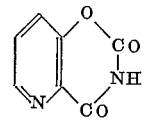

The catalytic hydrogenation of 2H-pyrido[2,3-e][1,3] oxazine-2,4(3H)-dione is performed, e.g. in organic solvents such as dioxane, ethanol or dimethyl formamide, preferably in the presence of carbon dioxide under moderately raised pressures of about 3–50 atmospheres at room temperature or moderately raised temperature, using noble metal catalysts, particularly palladium on charcoal. It is continued until substantially twice the equimolar amount of hydrogen has been taken up. This point is characterised, under the reaction conditions given above, by the cessation or at least abatement of the hydrogen take-up. Often, the hydrogenation product crystallises on just concentrating the filtered hydrogenation solution; if necessary, after completely evaporating off the solvent, it can be crystallised from another suitable organic solvent or mixture of solvents.

As stated above the invention also concerns the conversion of 5,6,7,8-tetrahydro-2H-pyrido[2,3-e][1,3]oxazine-2,4(3H)-dione into salts with inorganic or organic acids or bases. These salts have the same valuable pharmacological properties as the free compound of Formula I and may be prepared according to the usual methods well known in the art.

Hydrochloric acid, hydrobromic acid, sulfuric acid, phosphoric acid, methane sulfonic acid, ethane sulfonic acid, β-hydroxyethane sulfonic acid, tartaric acid, citric acid, lactic acid, fumaric acid, maleic acid or 1,5-naphthalene disulfonic acid can be used for example for salt formation with the oxazine derivative of Formula I.

Salts can also be formed with inorganic bases such as alkali and alkaline earth hydroxides, e.g. sodium hydroxide, potassium hydroxide, calcium hydroxide or ammonia. Organic bases which can be used for salt formation are, for example, dimethylaminoethanol, diethylaminoethanol, diethanolamine, ethanolamine, tri-n-butylamine, hydroxyethyl piperazine, ethylenediamine.

The oxazine derivatives of the invention as well as its addition salts with acids or bases have now been found to unexpectedly exhibit valuable pharmacological properties, among which there are, in particular, pronounced sedative and hypnotic (sleep inducing) activity which may be demonstrated by the fact that wide-awake animals are put to sleep by non-toxic doses of the inventive compounds, i.e. the oxazine derivative of Formula I or a pharmaceutically acceptable addition salt thereof. Also in humans a strong desire to sleep without unpleasant side-effects is observed after peroral administration of these compounds. In higher doses the compounds of the invention exhibit a highly narcotic effect in animals, i.e. induce deep anesthesia, which may illustratively be demonstrated e.g. by means of the test of Magnus-Girndt, the exact method of which is described by M. J. Thullier and R. Domenjoz in "Der Anaesthesists" 6, 163 (1957), and wherein the amount of test substance inducing a certain stage of narcosis in a test animal may be determined; it is found that the oxazine derivative of Formula I administered in a dose of 50 mg./kg. i.v. in the rabbit induces narcosis of stage IV, i.e. narcosis sufficiently deep to operate.

Another test indicative for the narcotic effect of a compound consists in determining the dose (ED$_{50}$) of test substance causing 50% of the animals employed in the test to remain in a side-position, which is the criterion for narcosis; administered in this test in mice the $ED_{50}$ of 5,6,7,8 - tetrahydro-2H-pyrido-[2,3-e][1,3]oxazine-2,4(3H)-dione is found to be 150 mg./kg. p.o.

The compounds of the invention also potentiate the effect of other narcotics. They, furthermore, exhibit strong analgesic and antiphlogistic action, which may illustratively be demonstrated e.g. by means of the test described by G. Wilhelmi, "Acta Medicinae Okayama" 18 No. 6, 302 (1964). In this "dental pain test" an electric current is applied to the pulp of the incisors in the guinea pig. Stimulation is produced by a transformed alternating current of 50 cycles with oneway rectification. The absolute threshold of irritation is determined in volts and its alteration after administration of the test substance is given as a percentage. In case of the compound of the above Formula I this alteration ranges from +13% to +95% on administration of doses of between 50 mg./kg. p.o. and 200 mg./kg. p.o., respectively.

In another test following the method described by G. Wilhelmi in "Etude des Anti-Inflammatoires au Moyen de l'Arthrite Experimentale du Rat" contained in "Rhumatismes Inflammatoires Chroniques," page 384 (IV$^e$ Confer Conference Internationale des Maladies Rhumatismales, Aix-les-Bains, France, 1964) pain is induced in rats by injecting intra-articularly 0.2 ml. of a 1% aqueous solution of $AgNO_3$ into the right knee of the animals. The pair reaction of the animals (squealing) is checked by bending and stretching of their right knee joint from 20 to 25 hours after the injection of the silver nitrate. The test substance suspended in an aqueous gum arabic solution is administered orally immediately after the first pain check, i.e. 20 hours after application of the silver nitrate. The pain checks are performed in intervals of 1 to 2 hours and the number of the animals without pain is determined from 21 to 25 hours after the application of the silver nitrate and given in percent of the number of totally employed animals. On administration of the compound of the above Formula I in a dose of 200 mg./kg. p.o. 88% of the animals showed no pain reaction.

The inventive compounds, moreover, exhibit muscle-relaxing and anticonvulsive activity.

The toxicity of 5,6,7,8 - tetrahydro - 2H-pyrido[2,3-e][1,3]oxazine-2,4 (3H)-dione is low and its $LD_{50}$ is >590 mg./kg. in mice and >480 mg./kg. in rats, both on oral administration.

Their pharmacological properties render the oxazin derivative of Formula I as well as its pharmaceutically acceptable addition salts particularly suitable as agents for the treatment of insomnia and sleep disturbances, conditions of unrest and anxiety, and for prolongation of the length of sleep. The compounds can also be used as anesthetics whereby the potentiating effect on other narcotics can be very desirable.

They can further be used, advantageously, for the treatment of painful conditions of e.g. post-operative or post-traumatic origin, which are paralleled by insomnia and make sleep-inducing effects desirable.

Their muscle-relaxing and anti-convulsive properties further render these compounds suitable for the treatment of spastic conditions accompanying e.g. rheumatic diseases.

The compound of Formula I may also be employed as an intermediate in the production of other compounds with valuable pharmacological properties.

For their intended uses the oxazine derivative of Formula I and its pharmaceutically acceptable addition salts with inorganic or organic acids or bases may be administered, preferably, orally or rectally in amounts depending on the species, age and weight of the subject under treatment as well as on the particular condition to be treated and, of course, the mode of administration; in general, the daily doses of 5,6,7,8-tetrahydro-2H-pyrido-[2,3-e][1,3]oxazine-2,4(3H)-dione, or the pharmaceutically acceptable addition salts thereof, vary between about 100 mg. and about 800 mg. the single dose thereby being, preferably, between about 25.0 mg. and about 250 mg.

For administration purposes, preferably, the above mentioned therapeutic compositions are used. These compositions are presented for oral or rectal administration in dosage units such as tablets, dragees (sugar coated tablets), capsule, suppositorie, and the like, preferably containing 25 to 250 mg. of active substances.

Dosage units for oral administration preferably contain between 1% and 90% of active substance. They are produced by combining an active substance mentioned above with, e.g. solid, pulverulent carriers such as lactose, saccharose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowaxes) of suitable molecular weights, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between different dosages of active substances. Soft gelatine capsules and other closed capsules consist, for example, of a mixture of gelatin and glycerine and contain e.g. mixtures of the active substance with Carbowax as a carrier. Hard gelatin capsules contain e.g. granules of the active substance with solid, pulverulent carriers such as lactose, saccharose, sorbitol, mannitol; starches such as potato starch, maize starch or amylopectin, cellulose derivatives or gelatine, as well as magnesium stearate or stearic acid. Examples of dosage units for rectal administration are suppositories which consist of a combination of the active substance with a neutral fatty foundation as carrier, or also gelatine rectal capsules which consist of a combination of the active substance or a suitable salt thereof wtih polyethylene glycols (Carbowaxes) of suitable molecular weight as carrier.

The following examples describe the production of the new compound and salts thereof as well as typical forms for application. The invention is in no way limited, however, to these examples. The temperatures are given in centigrade degrees, percentages are given by weight.

Example 1

16.4 g. of 2H-pyrido[2,3-e][1,3]oxazine-2,4(3H)-dione are dissolved in 250 ml. of dioxane and the solution, with the addition of 10 g. of palladium charcoal (5%) is hydrogenated at room temperature under 3–5 atm. excess hydrogen pressure. If hydrogenation ceases before the calculated amount of hydrogen has been taken up, 5 g. of catalyst are added once or twice. On completion of the hydrogenation (74 hours) the catalyst is filtered off and the filtrate is concentrated in vacuo. The crystalline residue is extracted first with 200 ml. and then with 100 ml. of hot acetone and the combined acetone extracts are concentrated until crystallisation begins. On cooling, colourless 5,6,7,8-tetrahydro-2-H-pyrido[2,3-e][1,3]oxazine-2,4(3H)-dione, M.P. 169°–171°, is obtained.

After concentrating the mother liquor, further substance having the same melting point crystallises.

Example 2

164 g. of 2H-pyrido[2,3-e][1,3]oxazine-2,4(3H)-dione are dissolved in 1800 ml. of dimethyl formamide and, after the addition of 30 g. of palladium charcoal (5%), hydrogenated at room temperature under an initial pressure of 30 atm. excess hydrogen pressure. After the addition of another 20 g. of catalyst, the hydrogenation ceases, 2 mol equivalents of hydrogen having been taken up. The catalyst is filtered off and the solution is concentrated under vacuo to about a third of its initial volume. After cooling for several hours with ice, some starting material crystallises. The crystals are filtered off and the filtrate is treated with charcoal and concentrated in vacuo to about 250 ml. After cooling, almost colourless 5,6,7,8- tetrahydro-2H-pyrido[2,3-e][1,3]oxazine-2,4(3H) - dione M.P. 169–171°, crystallises. On further concentrating the mother liquor, more tetrahydro compound crystallises, M.P. 168–171°. On dissolving and recrystallising from alcohol or acetone, colourless pure substance is obtained which melts at 169–171°.

Example 3

A mixture of hydrogen and carbon dioxide (9:1) is reacted at room temperature under 30–40 atm. excess pressure with 1.50 kg. of 2H-pyrido[2,3-e][1,3]oxazine-2,4(3H)-dione in 15 litres of dimethyl formamide, the reaction being performed in the presence of 250 g. of palladium charcoal (5%). The hydrogenation ceases after 2–2.6 mol. equivalents of hydrogen have been taken up. The catalyst is filtered off and the solvent is completely distilled off under reduced pressure. The evaporation residue is stirred with its weight of 40° warm water, the mixture is cooled to 0° and undissolved parts are filtered off under suction. The filter residue is recrystallised from dimethyl formamide/water. The 5,6,7,8-tetrahydro-2H-pyrido[2,3-e][1,3]-oxazine-2,4(3H)-dione obtained then melts at 169–171°.

Example 4

1.7 g. of 5,6,7,8-tetrahydro-2H-pyrido[2,3-e][1,3]oxazine-2,4(3H)-dione are dissolved in 20 ml. of dioxane and the equivalent amount of ethereal hydrochloric acid is added while stirring. The precipitated hydrochloride is filtered off under suction, washed first with 5 ml. of isopropanol and then with 10 ml. of ether and dried. It melts at 255–260° with decomposition after 230°.

Example 5

0.40 g. of 5,6,7,8-tetrahydro-2H-pyrido[2,3-e][1,3]oxazine-2,4(3H)-dione are dissolved in 3 ml. of dioxane and a solution of 150 mg. of potassium hydroxide in 1 ml. of ethanol is added while stirring. The precipitate formed is filtered off under suction and washed with isopropanol and ether. The salt melts at over 300° and begins to decompose after 250°.

Example 6

Substances for 1,000 tablets:

(I)

| | G. |
|---|---|
| Active substance | 50.0 |
| Lactose | 95.0 |
| Potato starch, dried | 50.0 |

(II)

| | |
|---|---|
| Gelatine | 12.0 |
| Glycerine | 20.0 |
| Highly dispersed silicic acid (unpressed Aerosil) | 2.0 |
| Dest. water, q.s. | |

(III)

| | |
|---|---|
| Potato starch, dried | 30.0 |
| Highly dispersed silicic acid (unpressed Aerosil) | 4.0 |
| Talcum | 35.0 |
| Magnesium stearate | 2.0 |
| | 300.0 |

The substances given under (I) are carefully mixed and moistened with the granulating solution given under (II). The mass is granulated through a sieve and dried. After drying, the sieved mixture is added to the substances given uner (III), the whole is carefully mixed and then pressed into 1,000 tablets each weighing 300 mg. and containing 50 mg. of active substance.

Example 7

Substances for 1,000 suppositories:

| | G. |
|---|---|
| Active substance | 100.0 |
| Adeps neutralis ad | 2000.0 |

The active substance, as finely ground as possible, is homogeneously suspended in the melt of carriers. 1,000 suppositories each weighing 2.0 g. and containing 100 mg. of active substance are poured from the mixture.

What is claimed is:

1. A therapeutic composition consisting essentially of from 25 mg. to 250 mg. of (1) 5,6,7,8-tetrahydro-2H-pyrido[2,3-e][1,3]oxazine-2,4-(3H)-dione or a pharmaceutically acceptable addition salt thereof with an inorganic or organic acid or base, and (2) a pharmaceutical carrier.

2. A method of inducing a sedative effect in a host which comprises administering to a host requiring such treatment effective amount of 5,6,7,8-tetrahydro-2H-pyrido[2,3-e][1,3]oxazine-2,4(3H)-dione, or a pharmaceutically acceptable addition salt thereof with an inorganic or organic acid or base.

3. A method of inducing an analgesic effect in a host which comprises administering to a host requiring such treatment an effective amount of 5,6,7,8-tetrahydro-2H-pyrido[2,3-e][1,3]oxazine-2,4(3H)-dione, or a pharmaceutically acceptable addition salt thereof with an inorganic or organic acid or base.

4. A method of treating spastic conditions in a host which comprises administering to said host an effective amount of 5,6,7,8-tetrahydro-2H-pyrido[2,3-e][1,3]oxazine-2,4(3H)-dione, or a pharmaceutically acceptable addition salt thereof with an inorganic or organic acid or base.

References Cited

UNITED STATES PATENTS 3,122,538   2/1964   Clausen-Kaas _____ 260—244

STANLEY J. FRIEDMAN, Primary Examiner